(12) United States Patent
Zhang et al.

(10) Patent No.: US 12,165,286 B1
(45) Date of Patent: Dec. 10, 2024

(54) METHOD FOR ESTABLISHING THREE-DIMENSIONAL ULTRASOUND IMAGE BLIND DENOISING MODEL, BLIND DENOISING METHOD AND STORAGE MEDIUM

(71) Applicant: HUAZHONG UNIVERSITY OF SCIENCE AND TECHNOLOGY, Hubei (CN)

(72) Inventors: Xuming Zhang, Hubei (CN); Yancheng Lan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/556,098

(22) PCT Filed: May 7, 2021

(86) PCT No.: PCT/CN2021/092155
§ 371 (c)(1),
(2) Date: Dec. 15, 2023

(87) PCT Pub. No.: WO2022/222199
PCT Pub. Date: Oct. 27, 2022

(30) Foreign Application Priority Data

Apr. 19, 2021 (CN) .......................... 202110417376.2

(51) Int. Cl.
*G06T 5/60* (2024.01)
*G06T 5/70* (2024.01)
(52) U.S. Cl.
CPC .................. *G06T 5/60* (2024.01); *G06T 5/70* (2024.01); *G06T 2200/04* (2013.01);
(Continued)

(58) Field of Classification Search
None
See application file for complete search history.

(56) References Cited

U.S. PATENT DOCUMENTS 11,893,789 B2* 2/2024 Hu ........................ G06T 3/4046
2018/0240219 A1 8/2018 Mentl et al.
(Continued)

FOREIGN PATENT DOCUMENTS

| CN | 107633486 | 1/2018 |
|---|---|---|
| CN | 110097512 | 8/2019 |

(Continued)

OTHER PUBLICATIONS

Y. Zhou et al., "Speckle Noise Reduction for OCT Images Based on Image Style Transfer and Conditional GAN," in IEEE Journal of Biomedical and Health Informatics, vol. 26, No. 1, pp. 139-150, Jan. 2022, doi: 10.1109/JBHI.2021.3074852.*

(Continued)

*Primary Examiner* — Jiangeng Sun
(74) *Attorney, Agent, or Firm* — JCIPRNET

(57) ABSTRACT

A method for establishing a three-dimensional ultrasound image blind denoising model and a use thereof include: adding a speckle noise to three-dimensional biological structure images of a same size and without speckle noise to obtain a training data set; establishing a three-dimensional denoising network based on an encoding-decoding structure, wherein the encoding structure is used to obtain N feature maps of a three-dimensional input image and perform a downsampling to obtain feature maps of different scales; the decoding structure is used to take a feature map obtained by the encoding structure as an input and reconstruct a three-dimensional image without speckle noise through upsampling; dividing the encoding-decoding structure into a plurality of stages by a downsampling structure and an upsampling structure; training the three-dimensional denois-
(Continued)

ing network using the training data set to obtain a three-dimensional ultrasound image blind denoising model.

8 Claims, 3 Drawing Sheets

(52) U.S. Cl.
CPC ............... *G06T 2207/10088* (2013.01); *G06T 2207/10132* (2013.01); *G06T 2207/20016* (2013.01); *G06T 2207/20081* (2013.01); *G06T 2207/20084* (2013.01); *G06T 2207/30004* (2013.01)

(56) References Cited

U.S. PATENT DOCUMENTS

| | | | | |
|---|---|---|---|---|
| 2020/0286208 A1* | 9/2020 | Halupka | ................ | G06N 3/045 |
| 2021/0125337 A1* | 4/2021 | Wilson | ................... | G06N 3/045 |
| 2023/0419451 A1* | 12/2023 | Azuma | ..................... | G06T 5/70 |

FOREIGN PATENT DOCUMENTS

| | | |
|---|---|---|
| CN | 112200750 | 1/2021 |
| CN | 112233026 | 1/2021 |
| CN | 112634159 | 4/2021 |

OTHER PUBLICATIONS

S. Bhute, S. Mandal and D. Guha, "Speckle Noise Reduction in Ultrasound Images using Denoising Auto-encoder with Skip connection," 2024 IEEE South Asian Ultrasonics Symposium (SAUS), Gujarat, India, 2024, pp. 1-4, doi: 10.1109/SAUS61785.2024. 10563715.*

A. P. Patil, A. Pramod, A. Harish, K. Singh and K. Purushotham, "An Approach to Image Denoising Using Autoencoders and Spatial Filters for Gaussian Noise," 2021 11th International Conference on Cloud Computing, Data Science & Engineering (Confluence), Noida, India, 2021, pp. 454-458, doi: 10.1109/Confluence51648.2.*

"International Search Report (Form PCT/ISA/210) of PCT/CN2021/ 092155," mailed on Jan. 19, 2022, with English translation thereof, pp. 1-4.

* cited by examiner

METHOD FOR ESTABLISHING THREE-DIMENSIONAL ULTRASOUND IMAGE BLIND DENOISING MODEL, BLIND DENOISING METHOD AND STORAGE MEDIUM

CROSS-REFERENCE TO RELATED APPLICATION

This application is a 371 of international application of PCT application serial no. PCT/CN2021/092155, filed on May 7, 2021, which claims the priority benefit of China application no. 202110417376.2, filed on Apr. 19, 2021. The entirety of each of the above mentioned patent applications is hereby incorporated by reference herein and made a part of this specification.

FIELD OF THE INVENTION

The invention belongs to the field of image denoising, and more specifically, relates to a method for establishing a three-dimensional ultrasound image blind denoising model and a use thereof.

DESCRIPTION OF RELATED ART

Ultrasound imaging has become a popular medical imaging technique due to its advantages of non-invasive, cheap, and real-time performance. In many cases, volume quantification is important in assessing disease progression and tracking the progress of treatment response, but two-dimensional ultrasound imaging may not accurately obtain important three-dimensional information such as three-dimensional morphology, surface characteristics, and spatial location relationships of lesions. Therefore, three-dimensional ultrasound imaging has received widespread attention in recent years. Research on three-dimensional ultrasound imaging techniques began in the twentieth century—in the 1970s. Due to the slow imaging process and complicated use, the clinical use thereof has been limited. With the rapid development of computer techniques, three-dimensional ultrasound imaging has made significant progress and has entered the clinical application stage. Three-dimensional ultrasound images contain a large amount of speckle noise, thus reducing the spatial resolution and contrast of ultrasound images, making the interpretation and segmentation of ultrasound images more difficult. In particular, the reduction in segmentation accuracy interferes with subsequent feature extraction and classification. Therefore, in ultrasound imaging, effective denoising is an essential preprocessing to improve human interpretation and accurate segmentation.

In recent years, a large number of methods have emerged to remove speckle noise in three-dimensional ultrasound images, wherein many methods rely on despeckling algorithms for two-dimensional ultrasound images (such as Lee filter, Frost filter, Kuan filter, SRAD filter, and OBNLM method) to denoise three-dimensional ultrasound images using slice-by-slice denoising. However, in three-dimensional images, the noise on adjacent slices is highly correlated, and the slice-by-slice denoising method does not take into account the three-dimensional correlation of the image structure. Therefore, Sun et al. extended SRAD to three dimensions, which, like SRAD, retains the advantages of traditional anisotropic diffusion and Lee filters by utilizing instantaneous variation coefficients. In addition, three-dimensional SRAD uses three-dimensional image information, overcoming the shortcomings of two-dimensional SRAD that only uses two-dimensional slice information. Kim et al. took a different approach and proposed a new three-dimensional ultrasound image denoising algorithm based on sparse representation, which aims to effectively reduce image noise while maintaining three-dimensional edge information with minimal artifacts. This method first converts speckle noise into additive Gaussian noise via logarithmic transformation, then uses sparse representation to reduce Gaussian noise, and lastly restores the denoised image via exponential transformation. Sagheer et al. proposed a three-dimensional ultrasound despeckling method based on tensor low-rank approximation, which may fully integrate redundant information in three-dimensional ultrasound images and preserve the edges and other finer details of the images. The algorithm solves the low-rank tensor approximation of grouped tensors by minimizing the tensor core norm under the framework of tensor singular value decomposition, and establishes a three-dimensional ultrasound image model. The result optimization issue is solved using the inexact augmented Lagrange multiplier method. Maggioni et al. extended BM3D to three-dimensional space and proposed four-dimensional block matching filtering (BM4D), in which using the idea of group collaborative filtering, similar d-dimensional blocks are stacked in a (d+1)-dimensional array, and joint filtering is performed in the transformation domain. In BM3D, the basic data block is a pixel block, while in BM4D, voxel cubes are used, and these cubes are stacked into a 4D array. In the transform domain on the array, the spectrum of the array is highly sparse due to the simultaneous use of local correlations between voxels in each cube and non-local correlations between corresponding voxels in different cubes. Signal and noise may be separated very effectively via coefficient shrinkage, and then the estimate of each group of cubes is obtained via inverse transformation, which is lastly adaptively clustered at the original position thereof. This method combines the advantages of transform domain and non-local noise reduction, and is currently recognized as the best algorithm for denoising three-dimensional ultrasound images. However, it has shortcomings such as large computational complexity and the inability to achieve real-time image denoising.

Generally, existing three-dimensional ultrasound image denoising methods may lose image details during the denoising process, affecting the quality of the denoised image, or require a large amount of calculation and may not achieve real-time denoising. Therefore, it is of great significance to propose an effective denoising method that may remove speckle noise in three-dimensional ultrasound images in real time while fully retaining image detail information.

SUMMARY OF THE INVENTION

In view of the shortcomings and improvement needs of the existing techniques, the invention provides a method for establishing a three-dimensional ultrasound image denoising model and a use thereof. The object thereof is to fully retain the detailed information of an image while removing speckle noise in a three-dimensional ultrasound image in real time.

In order to achieve the above goal, according to one aspect of the invention, a method for establishing a three-dimensional ultrasound image denoising model is provided, including:

adding a speckle noise to three-dimensional biological structure images of a same size and without speckle noise, and forming a training data set of images before and after adding the speckle noise;

establishing a three-dimensional denoising network based on an encoding-decoding structure to blindly denoise a noisy three-dimensional input image and output a three-dimensional image without speckle noise; the encoding structure in the encoding-decoding structure is used to obtain N feature maps of the three-dimensional input image, downsample the N feature maps, and further extract feature maps of different scales; the decoding structure in the encoding-decoding structure is used to take the feature maps obtained by the encoding structure as an input and reconstruct the three-dimensional image without speckle noise through upsampling; the encoding-decoding structure is divided into a plurality of stages by the downsampling structure and the upsampling structure. A number of convolution layers in a stage of a larger-scale feature map is less than or equal to a number of convolution layers in a stage of a smaller-scale feature map; N is a positive integer;

training the three-dimensional denoising network using the training data set, and obtaining a three-dimensional ultrasound image blind denoising model after the training.

In the invention, the three-dimensional denoising network is established based on the encoding-decoding structure. Since in the encoding-decoding structure, the features extracted by the encoding structure are fused with an image of the same scale reconstructed by the decoding structure, loss of the detailed information of the image during the feature extraction process may be avoided. In this way, the speckle noise in the three-dimensional ultrasound image is removed while fully retaining the detailed information of the image, ensuring the image quality after denoising; statistics of a number of parameters and a floating point calculation amount of a single three-dimensional convolution layer at each stage at the corresponding feature map scale and input and output channels thereof reveals that when the scale of the shallow feature map is larger, the calculation amount of the convolution layer is larger and the number of parameters is smaller; compared with the existing encoding-decoding structure in which the number of convolution layers at each stage is set to be the same, in the invention, the distribution of convolution layers in the three-dimensional denoising network is optimized, so that the number of convolution layers in the stage of the larger-scale feature map is less than or equal to the number of convolution layers in the stage of the smaller-scale feature map, so as to effectively reduce the number of convolution layers when the layer feature map scale is large, greatly reduce the calculation amount of the network, and improve the real-time performance of denoising.

Furthermore, the three-dimensional denoising network also includes a noise distribution sub-network, and one concatenation layer is connected after a first convolution layer in the encoding structure:

the noise distribution sub-network is used to estimate a noise distribution map of the three-dimensional input image;

the first convolution layer in the encoding structure is used to extract N−1 feature maps of the three-dimensional input image, and the concatenation layer is used to concatenate the N−1 feature maps and the noise distribution map to obtain N feature maps of the three-dimensional input image.

In the invention, the noise distribution map of the three-dimensional input image is estimated using a noise estimation sub-network, and fused with a plurality of feature maps of the three-dimensional input image as the input of the encoding-decoding structure. The estimated noise distribution map may be used as marker information to distinguish the noise level of the three-dimensional input image, so that the trained model has better denoising effect on all three-dimensional input images with different noise levels, thus improving the generalization ability of the model.

Further, the noise estimation sub-network includes a plurality of three-dimensional convolution layers connected in sequence.

Furthermore, when training the three-dimensional denoising network, a loss function used is:

$$L_{total}=L_{denoised}+\lambda_1 L_{noise-map}+\lambda_2 L_{TV}.$$

wherein $L_{noise-map}$, $L_{denoised}$, $L_{TV}$, and $L_{total}$ are a noise distribution loss function, a denoised result loss function, a total variation regularization term, and a total loss function respectively, $\lambda_1$ and $\lambda_2$ are regularization term coefficients; $L_{TV}=\|\nabla_h v'\|_2^2+\|\nabla_v v'\|_2^2+\|\nabla_d v'\|_2^2$, $\nabla_h$, $\nabla_v$, and $\nabla_d$ are gradients in horizontal, vertical, and depth directions, respectively.

In the invention, when training the model, the noise distribution loss function, the denoised result loss function, and the total variation regularization term are taken into account at the same time, thus guaranteeing that the trained three-dimensional ultrasound image blind denoising model may accurately estimate the noise distribution of the three-dimensional input image and accurately complete denoising, and, the introduction of the total variation regularization term may constrain the gradient of the input image and maintain the smoothness of the image.

Furthermore, the process of training the three-dimensional denoising network using the training data set is completed by a graphics processing unit (GPU).

In the invention, the training process of the three-dimensional denoising network is performed using the GPU, and the training efficiency of the model may be improved via the acceleration function of the hardware.

Furthermore, in the encoding-decoding structure, each convolution layer is followed by one group regularization layer; and the group regularization layer regularizes an output of the convolution layer therebefore.

Limited by the computing power of the GPU, the training batch is often reduced during the training process. For example, the training batch is set to only 4; in the traditional encoding-decoding structure, the convolution layer is followed by a batch normalization (BN) layer. When the batch size is decreased, the regularization effect is worse; in the invention, the output results of the convolution layer are regularized using group normalization (GN) to ensure a better regularization effect when the batch size is reduced.

Further, the method also includes, before training the three-dimensional denoising network using the training data set: searching for a fastest convolution algorithm for each convolution layer using compute unified device architecture (CUDA).

The invention may significantly speed up the training speed and the inference speed of the model by using CUDA to search for the fastest convolution algorithm for each convolution layer before training the three-dimensional denoising network using the training data set.

Further, the three-dimensional biological structure image without speckle noise is a three-dimensional magnetic resonance (MR) simulation image.

The biological structures in MR simulation images are clear, and the training data set using three-dimensional MR simulation images is of higher quality, which may further ensure the training effect of the model.

According to another aspect of the invention, a blind denoising method for a three-dimensional ultrasound image is provided, including: preprocessing a three-dimensional ultrasound image to be denoised to make it suitable for inputting into a three-dimensional ultrasound image blind denoising model obtained by the method for establishing the three-dimensional ultrasound image blind denoising model provided by the invention, and the preprocessed three-dimensional ultrasound image is input into the three-dimensional ultrasound image blind denoising model to remove speckle noise in the three-dimensional ultrasound image to be denoised.

Based on the blind denoising model of the three-dimensional ultrasound image established by the invention, the blind denoising method for the three-dimensional ultrasound image provided by the invention may fully retain the detailed information of an image while removing a speckle noise in the three-dimensional ultrasound image in real time.

According to yet another aspect of the invention, a computer-readable storage medium is provided, including a stored computer program; when the computer program is executed by a processor, an equipment where the computer-readable storage medium is located is controlled to execute the method for establishing the three-dimensional ultrasound image blind denoising model provided by the invention, and/or the blind denoising method for the three-dimensional ultrasound image provided by the invention.

Generally, via the above technical solutions conceived by the invention, the following beneficial effects may be achieved:

(1) In the invention, the three-dimensional denoising network is established based on the encoding-decoding structure to remove the speckle noise of the three-dimensional input image and optimize the convolution layer distribution in the three-dimensional denoising network, so that the number of convolution layers in the stage of the larger-scale feature map is less than or equal to the number of convolution layers in the stage of the smaller-scale feature map, so as to remove the speckle noise in the three-dimensional ultrasound image in real time while fully retaining the detailed information of the image.

(2) In the invention, the noise distribution map of the three-dimensional input image is estimated using the noise estimation sub-network, and fused with the plurality of feature maps of the three-dimensional input image as the input of the encoding-decoding structure. The estimated noise distribution map may be used as marker information to distinguish the noise level of the three-dimensional input image, so that the trained model has better denoising effect on all three-dimensional input images with different noise levels, thus improving the generalization ability of the model.

(3) In the invention, the training process of the three-dimensional denoising network is performed using the GPU, and the training efficiency of the model may be improved using the acceleration function of the hardware; before training the three-dimensional denoising network using the training data set, searching for the fastest convolution algorithm for each convolution layer using CUDA may greatly speed up the training speed and the inference speed of the model.

DESCRIPTION OF THE EMBODIMENTS

Figure 1:
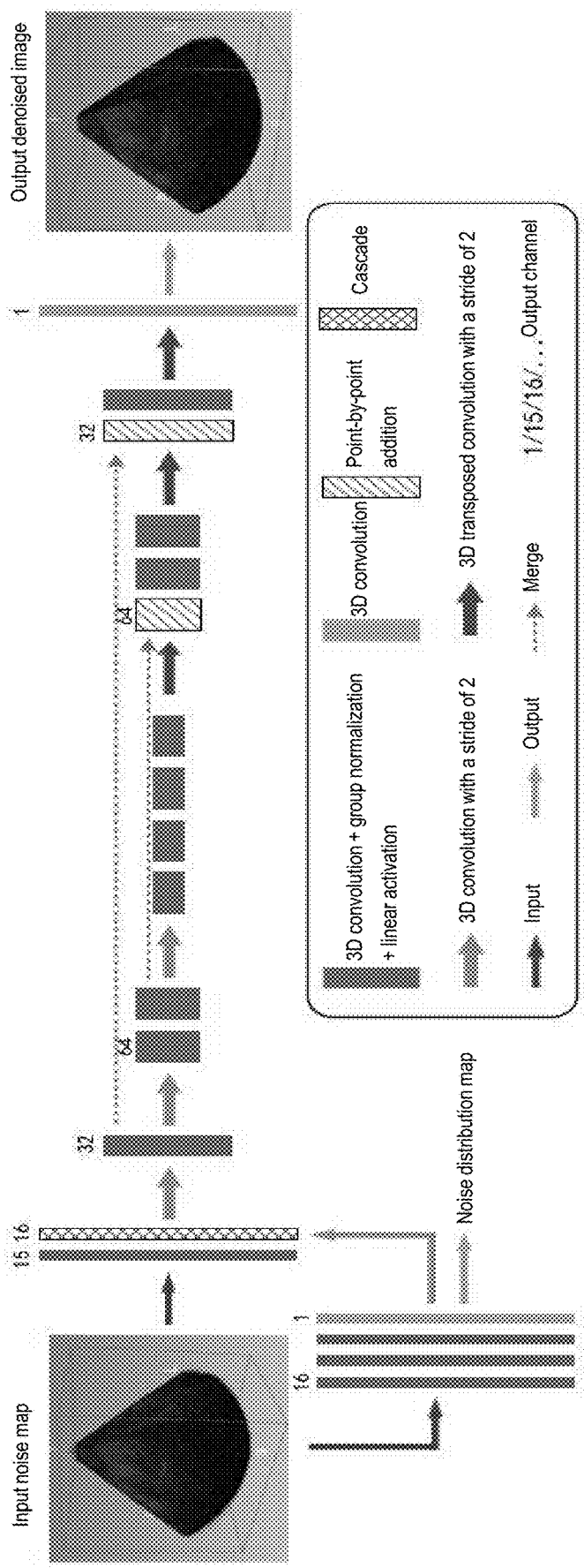
FIG. 1 is a schematic diagram of decoupling strands of a three-dimensional ultrasound image denoising model provided by an embodiment of the invention.

In order to make the objects, technical solutions, and advantages of the invention clearer, the invention will be further described in detail below with reference to the accompanying drawings and embodiments. It should be understood that the specific embodiments described here are only used to explain the invention and are not intended to limit the invention. In addition, the technical features involved in the various embodiments of the invention described below may be combined with each other as long as they do not conflict with each other.

In the invention, the terms "first", "second", etc. (if present) in the invention and the accompanying drawings are used to distinguish similar objects and are not necessarily used to describe a specific order or sequence.

In view of the technical issue that the existing methods for removing speckle noise in three-dimensional ultrasound images may not meet the requirements of real-time performance and denoised image quality at the same time, the invention provides a method for establishing a three-dimensional ultrasound image blind denoising model and a use thereof. The overall idea thereof is: a three-dimensional denoising model is established based on an encoding-decoding structure to fully retain the detailed information of the image while removing speckle noise in the three-dimensional ultrasound image, and based on the characteristics of the parameter amount and floating point calculation amount of a single three-dimensional convolution layer at each stage at the corresponding feature map scale and input and output channels thereof, the distribution of convolution layers in the three-dimensional denoising model is optimized to significantly reduce the computational complexity of the network and achieve real-time denoising. On this basis, the noise estimation sub-network is further used to estimate the noise distribution of the three-dimensional input image as label information, and the fusion of feature maps of three-dimensional input images enables the model to have better denoising effects on all three-dimensional input images with different noise levels.

The following are embodiments.

Example 1 a method for establishing a three-dimensional ultrasound image denoising model includes: a data preprocessing step, a model establishing step, and a model training step.

The data preprocessing step:

adding a speckle noise to three-dimensional biological structure images of a same size and without speckle noise, and forming a training data set of images before and after adding the speckle noise;

considering that the biological structure in an MR (magnetic resonance) simulation image is clear, in order to ensure the training effect of the model, optionally, in the present embodiment, specifically, the training data set is constructed using three-dimensional MR simulation images of the brain; in some other embodiments of the invention, the training data set may also be constructed using three-dimensional images with clear biological structures such as three-dimensional CT (computed tomography) images; and the training data set may also be constructed using images of other parts of the human body;

in the present embodiment, when constructing the training data set, the size of each brain three-dimensional MR image is 96×96×96; it is easy to understand that, if the original three-dimensional biological structure image without speckle noise is larger than the input image size expected by the model, the image may be divided into a plurality of image blocks with a size of 96×96×96, and then the divided image blocks are used to construct the training data set;

when adding noise to the three-dimensional MR simulation images of the brain, the specific formula is:

$$u = v + \sqrt{v} \Box \eta$$

wherein u and v are noisy images and noise-free images respectively, η is the noise term and obeys the normal distribution; in the constructed training data set, each training sample consists of a pair of images before and after noise is added; it should be noted that in some other embodiments of the invention, other noise models may also be used to add noise to image blocks, which are not listed here.

The model establishing step:

establishing a three-dimensional denoising network based on an encoding-decoding structure to blindly denoise a noisy three-dimensional input image and output a three-dimensional image without speckle noise;

as shown in FIG. 1, the encoding structure in the encoding and decoding structure is used to obtain N feature maps of the three-dimensional input image, downsample the N feature maps, and further extract feature maps of different scales; N is a positive integer, and the value thereof is equal to the number of input channels of the first downsampling, as shown in FIG. 1. In the present embodiment, N=16. Specifically, the encoding structure downsamples the N feature maps three times;

the decoding structure in the encoding-decoding structure is used to take the feature maps obtained by the encoding structure as input and reconstruct the three-dimensional image without speckle noise via upsampling: in the present embodiment, the decoding structure specifically upsamples the input feature map three times;

the encoding-decoding structure is divided into a plurality of stages by the downsampling structure and the upsampling structure. The number of stages is specifically 2n+1. Since the encoding-decoding structure has a certain symmetry, the number of downsampling and the number of upsampling are equal, and n represents the number of upsampling or downsampling; in the present embodiment, the encoding-decoding structure is specifically divided into seven stages by the downsampling/upsampling structure;

statistics of the number of parameters and the floating-point calculation amount of a single three-dimensional convolution layer at each stage at the corresponding feature map scale and input and output channels thereof reveal that when the scale of the shallow feature map is larger, the calculation amount of the convolution layer is larger and the number of parameters is smaller. Therefore, reducing the number of convolution layers in this part may reduce the calculation amount while ensuring the denoising effect of the model; in order to reduce the calculation amount and improve the real-time performance of three-dimensional ultrasound image denoising, in the present embodiment, the distribution of convolution layers in the three-dimensional denoising network is optimized, so that the number of convolution layers in the stage of the larger-scale feature map is less than or equal to the number of convolution layers in the stage of the smaller-scale feature map; specifically, in the present embodiment, the number of convolution layers in each stage is sequentially (1, 1, 2, 4, 2, 1, 1); as shown in FIG. 1, the number of channels in each stage is sequentially (16, 32, 64, 128, 64, 32, 16);

it should be noted that in actual applications, the number of downsampling/upsampling in the encoding-decoding structure may be changed. In this case, the number of convolution layers in each stage may be set according to the actual structure of the encoding-decoding structure;

in order to improve the generalization ability of the model and make the model have good denoising effect on three-dimensional ultrasound images with different noise levels, as shown in FIG. 1, in the present embodiment, the established three-dimensional denoising network also includes a noise distribution sub-network, and one concatenation layer is connected after the first convolution layer in the encoding solution structure;

the noise distribution sub-network is used to estimate a noise distribution map of the three-dimensional input image;

the first convolution layer in the encoding structure is used to extract 15 feature maps of the three-dimensional input image, and the concatenation layer is used to concatenate the 15 feature maps and the noise distribution map to obtain 16 feature maps of the three-dimensional input image;

it should be noted that in other embodiments of the invention, when the noise level of the three-dimensional ultrasound image is not changed significantly, the generalization ability of the model may also not be considered. Correspondingly, the established three-dimensional denoising network does not need to contain the noise distribution sub-network. In this case, there is also no concatenation layer in the encoding structure, and 16 feature maps of the three-dimensional input image are directly extracted from the first convolution layer in the encoding structure and inputted into the next layer.

The model training step:

training the three-dimensional denoising network using the training data set, and obtaining a three-dimensional ultrasound image blind denoising model after the training;

as an optional implementation, in the present embodiment, when training the three-dimensional denoising network, the loss function used is:

$$L_{total}=L_{denoised}+\lambda_1 L_{noise-map}+\lambda_2 L_{TV}$$

wherein $L_{total}$ is total loss function; $L_{noise-map}$ is noise distribution loss function, total $L_{noise-map}=\|\eta-\eta'\|_2^2$, $\eta$ and $\eta'$ are added noise term and estimated noise distribution map respectively, $\|\Box\|_2^2$ is the $L_2$ norm of the matrix; $L_{denoised}$ is denoised result loss function, $L_{denoised}=\|v-v'\|_2^2$, v and v' are image block label and denoised image block respectively; $L_{TV}$ is total variation regular term, $L_{TV}=\|\nabla_h v'\|_2^2+\|\nabla_v v'\|_2^2+\|\nabla_d v'\|_2^2$, $\nabla_h$, $\nabla_v$, and $\nabla_d$ are gradients in the horizontal, vertical, and depth directions respectively; and $\lambda_1$ and $\lambda_2$ are regularization coefficients. Optionally, in the present embodiment, the values of $\lambda_1$ and $\lambda_2$ are 0.1 and 0.01 respectively;

in the present embodiment, when training the model, noise distribution loss function, denoised result loss function, and total variation regularization term are considered at the same time, thus guaranteeing that the trained three-dimensional ultrasound image blind denoising model may accurately estimate the noise distribution of the three-dimensional input image and accurately complete denoising, and, the introduction of the total variation regularization term may constrain the gradient of the input image and maintain the smoothness of the image;

in order to further accelerate the training process of the model, in the present embodiment, the process of training the three-dimensional denoising network using the training data set is completed by a GPU, so that the training efficiency of the model may be improved using the acceleration function of the hardware; considering the limitation of GPU computing power, it is necessary to reduce the training batch. Optionally, in the present embodiment, specifically, the training batch is set to 4. In the traditional encoding-decoding structure, the convolution layer is followed by a batch normalization (BN) layer. When the batch size is decreased, regularization effect is worse. To address this issue, as shown in FIG. 1, in the present embodiment, group regularization (GN) is used instead of batch regularization (BN) to regularize the output of the convolution layer, and the performance of the three-dimensional denoising network is improved in small batches via GN.

In order to further speed up the training speed and the inference speed of the model, optionally, before training the three-dimensional denoising network using the training data set, the present embodiment also includes: searching for a fastest convolution algorithm for each convolution layer using CUDA.

Specifically, in the present embodiment, a three-dimensional denoising network is established based on an encoding-decoding structure. Since in the encoding-decoding structure, the features extracted by the encoding structure are fused with an image of the same scale reconstructed by the decoding structure, loss of the detailed information of the image during the feature extraction process may be avoided. In this way, the speckle noise in the three-dimensional ultrasound image is removed while fully retaining the detailed information of the image, ensuring the image quality after denoising; statistics of the number of parameters and the floating point calculation amount of a single three-dimensional convolution layer at each stage at the corresponding feature map scale and input and output channels thereof reveal that when the scale of the shallow feature map is larger, the calculation amount of the convolution layer is larger and the number of parameters is smaller; compared with the existing encoding-decoding structure in which the number of convolution layers at each stage is set to be the same, in the present embodiment, the distribution of convolution layers in the three-dimensional denoising network is optimized, so that the number of convolution layers in the stage of the larger-scale feature map is less than or equal to the number of convolution layers in the stage of the smaller-scale feature map, so as to effectively reduce the number of convolution layers when the layer feature map scale is large, significantly reduce the calculation amount of the network, and improve the real-time performance of denoising. The three-dimensional ultrasound image blind denoising model established in the present embodiment may be used to achieve blind denoising of three-dimensional ultrasound images of different parts and different noise levels.

Example 2 a blind denoising method for a three-dimensional ultrasound image includes preprocessing a three-dimensional ultrasound image to be denoised to make it suitable for inputting into a three-dimensional ultrasound image blind denoising model obtained by the method for establishing the three-dimensional ultrasound image blind denoising model provided by Example 1, and the preprocessed three-dimensional ultrasound image is input into the three-dimensional ultrasound image blind denoising model to remove speckle noise in the three-dimensional ultrasound image to be denoised; preprocessing includes handling of image size.

The three-dimensional ultrasound image blind denoising method provided in the present embodiment may fully retain the detailed information of the image while removing speckle noise in the three-dimensional ultrasound image in real time.

Example 3 a computer-readable storage medium, including a stored computer program: when the computer program is executed by a processor, an equipment where the computer-readable storage medium is located is controlled to execute the method for establishing the three-dimensional ultrasound image blind denoising model provided by Example 1, and/or the blind denoising method for the three-dimensional ultrasound image provided by Example 2.

The following is a further explanation of the beneficial effects achieved by the invention in combination with comparative experiments. In the comparison experiments, real three-dimensional ultrasound images are used for testing, and the denoising results are comprehensively evaluated from both subjective and objective aspects; in the experiments, the existing three-dimensional ultrasound image denoising method in 2 is selected as comparative examples, marked as Comparative example 1 and Comparative example 2, as follows:

Comparative example 1: denoising is achieved slice by slice according to the OBNLM method in (IEEE. Trans Image Proc. 18 (10) (2009) 2221-2229). The specific parameters are: the search window size is selected as 17×17, and the similarity window size is selected as 7×7;

Comparative example 2: denoising is achieved according to the BM4D method in (IEEE. Trans Image Proc. 22 (1) (2013) 119-133).

The denoising effect of Example 2 is compared with Comparative example 1 and Comparative example 2. For convenience of description, the real-time blind denoising method for the three-dimensional ultrasound image provided in Example 2 is denoted as three-dimensional-BDN (three-dimensional Blind Despeckling Network). Objective evaluation indicators include EPI (edge preservation index) and CPU time consumption, which are used to determine real-time effects, wherein EPI is defined as follows:

$$EPI = \frac{\nabla_h p_s + \nabla_v p_s + \nabla_d p_s}{\nabla_h p_0 + \nabla_v p_0 + \nabla_d p_0}$$

wherein $p_s$ and $p_o$ are the denoised image and the original image respectively, and $\nabla_h$, $\nabla_v$, and $\nabla_d$ are the gradients in the horizontal, vertical, and depth directions respectively. To calculate this indicator, first the edge of the image needs to be detected. In the experiment, the classic Canny operator is used and the upper and lower thresholds are set to 100 and 20 respectively. Then, the gradients of the image are calculated and summed from the three dimensions of horizontal, vertical, and depth. The ratio of the edge gradient sum of the image after denoising to the edge gradient sum of the image before denoising is EPI. The larger the EPI value, the stronger the edge preservation ability.

Real kidney three-dimensional ultrasound images are used to test the denoising effect, and the denoising time of the three denoising methods on the CPU is statistically calculated. The same Canny operator is used to extract edges from the denoised image to calculate EPI. The results are shown in Table 1. As may be seen from the table, for real three-dimensional ultrasound images, the CPU time consumption of denoising by the three-dimensional-BDN method is much lower than that of the comparative method, and the EPI is also significantly higher than the comparative examples. Moreover, since deep learning methods do not require code changes, CUDA may be used for acceleration by simply specifying the GPU, and the time consumption of denoising on a GTX2080Ti is only 24.85 ms, which is converted into a frame rate of about 40 frames, which may meet the requirements of real-time denoising.

TABLE 1

Comparison of average CPU time consumption and EPI value of each method for denoising real kidney three-dimensional ultrasound images

| Noise reduction method | Average CPU time consumption (s) | EPI |
| --- | --- | --- |
| OBNLM | 129.35 | 0.24 |
| BM4D | 150.60 | 0.68 |
| Three-dimensional-BDN | 8.92 | 0.75 |

Figure 2A:
FIG. 2A is a three-dimensional view of a clinical real ultrasound image provided by an embodiment of the invention.
Figure 2B:
FIG. 2B is a three-dimensional view of a denoised image obtained by using the blind denoising method for a three-dimensional ultrasound image provided by the invention provided by an embodiment of the invention.
Figure 2C:
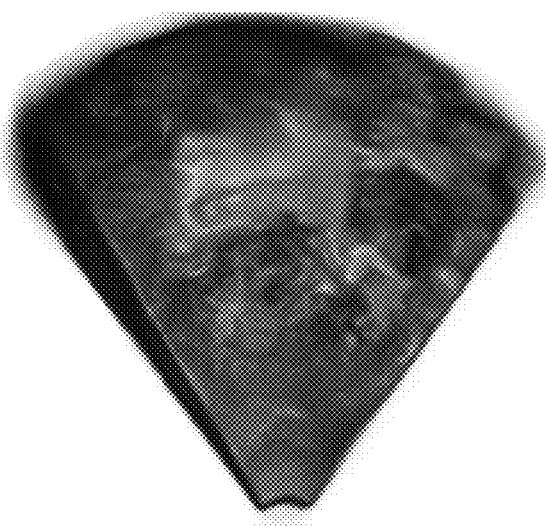
FIG. 2C is a three-dimensional view of a denoised image obtained by using the OBNLM (optimized-bayesian-nonlocal-means-with-block) method provided by an embodiment of the invention.
Figure 2D:
FIG. 2D is a three-dimensional view of a denoised image obtained by using the BM4D (block matching and 4D filtering) method provided by an embodiment of the invention.
Figures 3A, 3B:
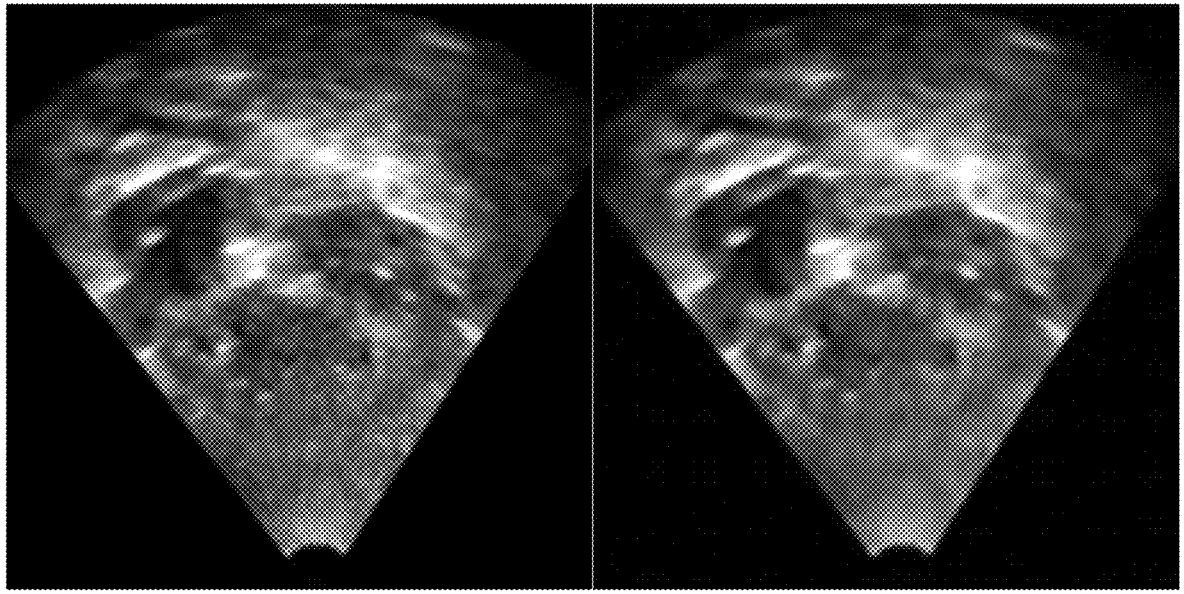
FIG. 3A is a coronal plane view of a coronal plane of a clinical real ultrasound image provided by an embodiment of the invention.
FIG. 3B is a coronal plane view of a coronal plane of a denoised image obtained by using the blind denoising method for a three-dimensional ultrasound image provided by the invention provided by an embodiment of the invention.
Figures 3C, 3D:
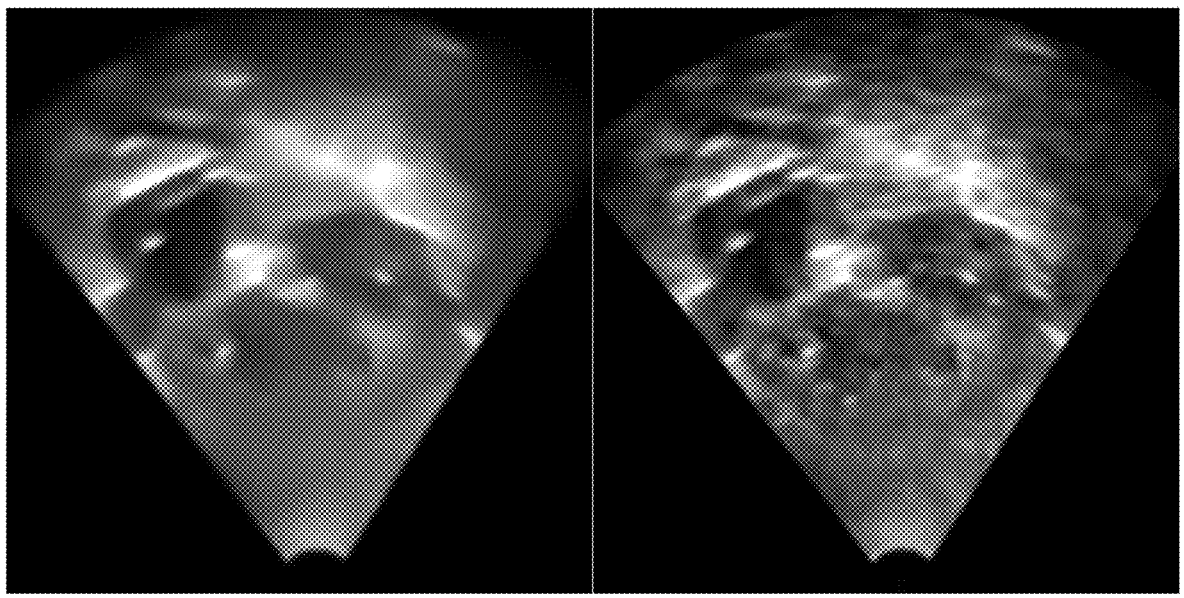
FIG. 3C is a coronal plane view of a coronal plane of a denoised image obtained by using the OBNLM method provided by an embodiment of the invention.
FIG. 3D is a coronal plane view of a coronal plane of a denoised image obtained by using the BM4D method provided by an embodiment of the invention.

In order to more intuitively display the denoising effects of different methods, three-dimensional views and coronal views of the denoised images corresponding to Example 2 and Comparative example 1 and Comparative example 2 are provided here, as shown in FIG. 2A to FIG. 2D and FIG. 3A to FIG. 3D. FIG. 2A is a clinical real three-dimensional ultrasound image, FIG. 2B is a three-dimensional denoised image obtained by using the blind denoising method for the three-dimensional ultrasound image provided in Example 2, FIG. 2C is a three-dimensional denoised image obtained by the OBNLM method, and FIG. 2D is a three-dimensional denoised image obtained by the BM4D method. FIG. 3A is the coronal plane of a clinical real three-dimensional ultrasound image, FIG. 3B is the coronal plane of a denoised image obtained by using the blind denoising method for the three-dimensional ultrasound image provided in Example 2, FIG. 3C is the coronal surface of a denoised image obtained by the OBNLM method, and FIG. 3D is the coronal surface of a denoised image obtained by the BM4D method. It may be seen from FIG. 2A to FIG. 2D and FIG. 3A to FIG. 3D that compared with other comparison methods, the three-dimensional-BDN method proposed in Example 2 may better protect image detail information while suppressing speckle noise in the image.

Based on the results of the above comparative experiments, it may be seen that the blind denoising method for the three-dimensional ultrasound image provided in Example 2 may remove speckle noise in the three-dimensional ultrasound image in real time while fully retaining the detailed information of the image.

Those skilled in the art may easily understand that the above descriptions are only preferred embodiments of the invention and are not intended to limit the invention. Any modifications, equivalent substitutions, and improvements and the like made within the spirit and principles of the invention shall be included in the scope of the invention.

What is claimed is:

1. A method for establishing a three-dimensional ultrasound image blind denoising model, characterized by comprising:
adding a speckle noise to three-dimensional biological structure images of a same size and without speckle noise, and forming a training data set of images before and after adding the speckle noise;
establishing a three-dimensional denoising network based on an encoding-decoding structure to blindly denoise a three-dimensional input image with noise and output a three-dimensional image without speckle noise; wherein an encoding structure in the encoding-decoding structure is used to obtain N feature maps of the three-dimensional input image, downsample the N feature maps, and further extract feature maps of different scales; a decoding structure in the encoding-decoding structure is used to take the feature maps obtained by the encoding structure as an input and reconstruct the three-dimensional image without speckle noise through upsampling; the encoding-decoding structure is divided into a plurality of stages by a downsampling structure and an upsampling structure, a number of convolution layers in a stage of a larger-scale feature map is less than or equal to a number of convolution layers in a stage of a smaller-scale feature map; N is a positive integer;

training the three-dimensional denoising network using the training data set, and obtaining the three-dimensional ultrasound image blind denoising model after the training, wherein when training the three-dimensional denoising network, a loss function used is:

$$L_{total} = L_{denoised} + \lambda_1 L_{noise\text{-}map} + \lambda_2 L_{TV}$$

wherein $L_{noise\text{-}map}$, $L_{denoised}$, $L_{TV}$, and $L_{total}$ are a noise distribution loss function, a denoised result loss function, a total variation regularization term, and a total loss function respectively, $\lambda_1$ and $\lambda_2$ are regularization term coefficients; and $L_{TV} = \|\nabla_h v'\|_2^2 + \|\nabla_v v'\|_2^2 + \|\nabla_d v'\|_2^2$, $\nabla_h$, $\nabla_v$, and $\nabla_d$ are gradients in horizontal, vertical, and depth directions respectively.

2. The method for establishing the three-dimensional ultrasound image blind denoising model of claim 1, wherein the three-dimensional denoising network also comprises a noise distribution sub-network, and one concatenation layer is followed by a first convolution layer in the encoding structure;

the noise distribution sub-network is used to estimate a noise distribution map of the three-dimensional input image;

the first convolution layer in the encoding structure is used to extract N−1 feature maps of the three-dimensional input image, and the concatenation layer is used to concatenate the N−1 feature maps and the noise distribution map to obtain the N feature maps of the three-dimensional input image.

3. The method for establishing the three-dimensional ultrasound image blind denoising model of claim 2, wherein the noise estimation sub-network comprises a plurality of three-dimensional convolution layers connected in sequence.

4. The method for establishing the three-dimensional ultrasound image blind denoising model of claim 1, wherein a process of training the three-dimensional denoising network using the training data set is completed by a graphics processing unit.

5. The method for establishing the three-dimensional ultrasound image blind denoising model of claim 4, wherein in the encoding-decoding structure, each of the convolution layer is followed by one group regularization layer; and the group regularization layer regularizes an output of the convolution layer therebefore.

6. The method for establishing the three-dimensional ultrasound image blind denoising model of claim 4, wherein before training the three-dimensional denoising network using the training data set, the method further comprises:
searching for a fastest convolution algorithm for each of the convolution layers using compute unified device architecture.

7. The method for establishing the three-dimensional ultrasound image blind denoising model of claim 1, wherein the three-dimensional biological structure image without speckle noise is a three-dimensional magnetic resonance simulation image.

8. A blind denoising method for a three-dimensional ultrasound image, comprising: preprocessing a three-dimensional ultrasound image to be denoised to make it suitable for inputting into the three-dimensional ultrasound image blind denoising model obtained by the method for establishing the three-dimensional ultrasound image blind denoising model of claim 1, and the preprocessed three-dimensional ultrasound image is input into the three-dimensional ultrasound image blind denoising model to remove a speckle noise in the three-dimensional ultrasound image to be denoised.

* * * * *